United States Patent [19]

Callens et al.

[11] Patent Number: 5,576,094

[45] Date of Patent: Nov. 19, 1996

[54] FOAM BOARDS PRODUCED USING HALOGEN-FREE BLOWING AGENTS

[75] Inventors: Julien N. R. Callens, Merksem; Alfons J. S. van Biesen, Opwijk, both of Belgium; Bernardo Wolff, Mannheim, Germany; Gerhard Alicke, Worms, Germany; Reinhold Weber, Mutterstadt, Germany; Franz-Josef Dietzen, Ludwigshafen, Germany; Klaus Hahn, Kirchheim, Germany

[73] Assignee: BASF Aktiengesellschaft, Ludwigshafen, Germany

[21] Appl. No.: 537,949

[22] PCT Filed: May 20, 1994

[86] PCT No.: PCT/EP94/01631

§ 371 Date: Nov. 21, 1995

§ 102(e) Date: Nov. 21, 1995

[87] PCT Pub. No.: WO94/28058

PCT Pub. Date: Dec. 8, 1994

[30] Foreign Application Priority Data

May 27, 1993 [DE] Germany ............................ 43 17 573.2
Feb. 1, 1994 [DE] Germany ............................ 44 02 909.8

[51] Int. Cl.$^6$ ................. B32B 3/26; B32B 7/12
[52] U.S. Cl. ............... 428/220; 428/305.5; 428/314.8; 521/79; 521/81; 521/146
[58] Field of Search ................. 428/220, 305.5, 428/314.8; 521/79, 81, 146

[56] References Cited

U.S. PATENT DOCUMENTS

| 4,636,527 | 1/1987 | Suh et al. | 521/46 |
| 4,916,166 | 4/1990 | Suh et al. | 521/146 |
| 5,106,882 | 4/1992 | Suh et al. | 521/146 |
| 5,269,987 | 12/1993 | Reedy | 521/81 |

*Primary Examiner*—Morton Foelak
*Attorney, Agent, or Firm*—Oblon, Spivak, McClelland, Maier & Neustadt, P.C.

[57] ABSTRACT

Extruded foam boards produced using halogen-free blowing agents from a styrene polymer thermoplastic matrix having a Vicat softening temperature VST B 50 of at most 100° and a melt index MVI 200/5 of at least 5 ml/10 min are at least 20 mm, preferably more than 50 mm and in particular from 80 to 200 mm, thick. Preferred blowing agents for producing the foam boards are carbon dioxide alone, as well as mixtures of carbon dioxide and ethanol and/or dimethyl ether.

17 Claims, No Drawings

FOAM BOARDS PRODUCED USING HALOGEN-FREE BLOWING AGENTS

The invention relates to foam boards produced using halogen-free blowing agents and a process for their production. The invention relates in particular to foam boards having a thickness of at least 20 mm and comprising a thermoplastic matrix based on a styrene polymer and closed cells which are free of halogen-containing gases.

For the production of foam boards based on styrene polymers by extrusion, many blowing agents have been proposed.

For example, EP-A-464 581 discloses a process for producing foam boards having high compressive strength and a cross section of at least 50 cm$^2$, in which process a mixture of a styrene polymer, from 5 to 16% by weight, based on the styrene polymer, of a blowing agent and, if desired, customary additives is extruded, with the blowing agent used being a mixture comprising a) 3 to 70% by weight of an alcohol or ketone having a boiling point in the range from 56° to 100° C., b) 5 to 50% by weight of carbon dioxide and c) 0 to 90% by weight of a saturated $C_3$–$C_5$-hydrocarbon and/or a hydrogen-containing fluorochlorinated or fluorinated hydrocarbon which boils in the range from −30° C. to +30° C.

The foam boards produced by the known processes have the disadvantage that the final values, for example for the dimensional stability on heating, are established relatively slowly.

JP-A-60/145 835 discloses the production of a laminated board having a polystyrene foam layer which has been produced by extrusion using an ether such as dimethyl ether, methyl ethyl ether or methyl vinyl ether as blowing agent. The example describes the production of a 6 mm thick plate using 3.7 parts by weight of dimethyl ether, based on polystyrene, as blowing agent.

It is also known that use of blowing agents which diffuse rapidly from the foam, eg. $CO_2$, frequently no longer ensure sufficient dimensional stability and compressive strength of foam boards having a board thickness of 20 mm or more, in particular equal to or greater than 50 mm. In addition, use of blowing agents having a high blowing power frequently gives foams having a high proportion of open cells.

Thus, in the process described in EP-A-464 581, the production of high-quality foam boards having a thickness of 20 mm or above is frequently possible only when using fluorochlorinated or fluorinated hydrocarbons as blowing agent. However, the latter are undesirable for environmental reasons.

The German Patent Application P 42 36 579.1 relates to a process for producing polystyrene foam boards using a blowing agent mixture which contains a dialkyl ether. In the examples, the thermoplastic matrix is always a homopolystyrene having a melt flow index of 4.5. The Vicat softening temperature of polystyrene is 101° C.

It is an object of the present invention to provide extruded foam boards based on styrene polymers which are produced using halogen-free blowing agents.

Another object of the invention is to provide a process for producing foam boards of styrene polymers having a minimum thickness of 20 mm, which process leads to foams having closed cells, only a low water absorbency and, apart from good dimensional stability and compressive strength, a high dimensional stability on heating. It is a further object of the invention to provide a process which makes possible the rapid establishment of the final values, particularly for the dimensional stability on heating, in the foam boards produced. The proportion of carbon dioxide in the blowing agent should be able to be very large.

A further object of the invention is the production of foam boards having a thickness of more than 50 mm, preferably from 80 to 200 mm, using blowing agent mixtures comprising ethanol and carbon dioxide and, in particular, carbon dioxide as sole blowing agent.

We have found that these objects are achieved by extruded foam boards having a minimum thickness of 20 mm and a cross section of at least 50 cm$^2$ produced using halogen-free blowing agents and comprising a thermoplastic matrix based on a styrene polymer, closed cells which are free of halogen-containing gases and, if desired, additives insoluble in the thermoplastic matrix, with the thermoplastic matrix having a Vicat softening temperature VST B 50 (in accordance with DIN 53 460) of at most 100° C. and a melt index MVI 200/5 (in accordance with DIN 53 735) of at least ml/10 min.

These objects are also achieved by a process for producing such foam boards by extrusion of a mixture of the plasticized styrene polymer thermoplastic matrix, a halogen-free blowing agent and, if desired, customary additives.

The key point of the invention is that it starts from a thermoplastic matrix having a Vicat softening temperature VST B 50 of at most 100° C., preferably at most 99° C. and in particular at most 95° C., and a melt index MVI 200/5 of at least 5 ml/10 min, preferably at least 7 ml/10 min and in particular at least 10 ml/10 min. The foam boards produced according to the invention are at least 20 mm thick, preferably more than 50 mm and in particular from 80 to 200 mm. The cross section is at least 50 cm$^2$, preferably from 100 to 1200 cm$^2$. They are closed-celled, ie. more than 90%, preferably more than 95%, of the cells are closed, which results in a low water absorption. The density of the foam boards is preferably from 20 to 60 g·l$^{-1}$.

Starting out from homopolystyrene, lowering the Vicat softening temperature and increasing the melt index are in principle possible in two ways: one method is incorporation of comonomers into the polystyrene chain or mixing homopolystyrene with appropriate copolymers; the other is by mixing a soluble plasticizer into polystyrene.

A particularly preferred thermoplastic matrix comprises a mixture of a) from 0.1 to 100% by weight of a block copolymer of from 50 to 99% by weight of styrene and from 1 to 50% by weight of conjugated dienes, and b) from 0 to 99.9% by weight of a styrene polymer different from a).

The thermoplastic matrix contains, as component a), from 0.1 to 100% by weight, preferably from 1 to 50% by weight and particularly preferably from 5 to 40% by weight, of a block copolymer of from 50 to 99% by weight, preferably from 55 to 90% by weight and particularly preferably from 60 to 85% by weight, of styrene on the one hand and from 1 to 50% by weight, preferably from 10 to 45% by weight, particularly preferably from 15 to 40% by weight, of conjugated dienes on the other hand. The block copolymer a) used is particularly preferably a star-shaped branched block copolymer.

The conjugated dienes used are generally ones having from 4 to 8 carbon atoms. Examples of conjugated dienes which can be employed, either alone or in admixture with one another, for preparing the branched block copolymers are butadiene, isoprene and 2,3-dimethylbutadiene. Among these, butadiene or isoprene are particularly favorable, with butadiene being again preferred.

The molecular weight of the star-shaped branched block copolymers is generally in the range from 50,000 to 1,000, 000 and is preferably from 100,000 to 500,000. These figures are the weight average of the molecular weight, determined by viscosity measurements in 0.5% strength by weight toluene solution at 25° C.

The star-shaped branched block copolymers particularly preferably used according to the invention as component a) have branches comprising copolymer blocks in which the styrene and the conjugated diene are incorporated in block form with formation of individual polymer segments. These copolymer blocks which are built up in blocks and form the branches are chemically linked to one another via a coupling agent. The star-shaped branched block copolymers have at least 3, in general from 3 to 10, and preferably 3 or 4, such branches, with these branches preferably comprising at least two types of copolymer blocks which have a different average structure. Furthermore, in general at least 50% by weight, preferably at least 60% by weight, of the total styrene polymerized into the star-shaped branched block copolymer are incorporated as terminal homopolymer segment in one or more of the copolymer blocks of the branches.

Further details on the star-shaped branched block copolymers a), which are known per se, can be found, for example, in EP-B-0 088 960 and EP-B-0 113 099.

The thermoplastic matrix of the invention can, however, also be a copolymer of styrene having a random distribution of the comonomers, or a blend of homopolystyrene with such a copolymer. Suitable copolymers are, for example, those containing from 1 to 30% by weight, preferably from 2 to 10% by weight, of a (meth)acrylic ester, preferably with a $C_4$–$C_{20}$-alcohol.

Other preferred thermoplastic matrices are mixtures of styrene polymers, preferably homopolystyrene, with plasticizers which are soluble in the polystyrene. Particular preference is given to mixtures of polystyrene with from 0.1 to 10% by weight, preferably from 0.5 to 6% by weight, of a liquid, aliphatic and/or cycloaliphatic hydrocarbon, an organic ester, ether, acid amide or polyether. Suitable plasticizers are, for example, technical-grade white oil ($C_{28}$–$C_{43}$-paraffin), esters of $C_4$–$C_{20}$-monoalcohols, diols or of glycerol with higher fatty acids, eg. adipic acid, phthalic acid, stearic acid and citric acid, also stearamides, alkyl ethers of diethylene and dipropylene glycol and also polyalkylene oxides. Use of such thermoplastic matrices enables foam boards having a thickness of more than 50 mm, preferably more than 80 mm and even more than 100 mm, to be produced using blowing agent mixtures/carbon dioxide and even carbon dioxide alone.

The production of the foam boards is, according to the invention, carried out in a manner known per se by extrusion. The thermoplastic matrix, plasticized by heating, is intimately mixed in an extruder with the blowing agent or blowing agent mixture and, if desired, further additives. The mixture then passes through a relaxation zone in which it is cooled to about 100°–120° C. while stirring continuously and is subsequently extruded through a nozzle to give boards.

Conventional additives and/or auxiliaries which can be added to the thermoplastic matrix are antistatic agents, stabilizers, dyes, fillers, flame retardants and/or nucleating agents in customary amounts.

In the process of the invention, the blowing agent or blowing agent mixture is used in an amount of from 1 to 15% by weight, preferably from 3 to 11% by weight, in particular from 4 to 8% by weight, based on the thermoplastic matrix. The blowing agents are halogen-free, volatile substances.

Preference is given to a blowing agent mixture comprising a) from 1 to 100% by weight of carbon dioxide, b) up to 95% by weight of an ether from the group dimethyl ether, methyl ethyl ether and methyl vinyl ether, c) up to 60% by weight of an alcohol or ketone having a boiling point in the range from 56° to 100° C., and d) up to 30% by weight of an aliphatic $C_3$–$C_6$-hydrocarbon.

A particularly preferred blowing agent mixture for foaming thermoplastic matrices of polystyrene and soluble plasticizers are mixtures of a) from 20 to 95% by weight, preferably from 75 to 25% by weight, of carbon dioxide, c) from 80 to 5% by weight, preferably 50–25% by weight, of ethanol, d) from 0 to 10% by weight of an aliphatic $C_3$–$C_6$-hydrocarbon.

In the case of thermoplastic matrices of styrene copolymers, particularly star-shaped branched styrene/butadiene block copolymers or their blends with homopolystyrene, preference is given to blowing agent mixtures of the following composition:

a) from 2 to 90% by weight of carbon dioxide, b) from 1 to 30% by weight of dimethyl ether, c) from 0 to 60% by weight of ethanol, and d) up to 10% by weight of an aliphatic $C_3$–$C_6$-hydrocarbon.

The invention has numerous advantages. The foam boards of the invention can be produced using halogen-free blowing agent mixtures, with the proportion of carbon dioxide in the blowing agent mixture being able to be high. By means of the process of the invention it is possible to obtain, in a simple and economical manner, thick foam boards from which the blowing agent quickly escapes, without the compressive strength being lowered. The foam boards produced by the process of the invention reach the final values for the compressive strength and dimensional stability on heating after only a short ageing time.

It is possible to use environmentally friendly blowing agents, which are already present in nature or, like dimethyl ether, are very quickly degraded. Dimethyl ether is degraded in air with a half life of a few days and thus does not accumulate in the atmosphere.

The parts and percentages specified in the examples are by weight.

EXAMPLES 1 and 2

91 parts of polystyrene having a softening temperature of 101° C. and a melt index of 4.5 ml/10 min and 9 parts of a star-shaped branched styrene-butadiene block copolymer having a butadiene content of 24% (Styrolux® KR 2688 from BASF AG) were continuously fed to an extruder having a screw diameter of 120 mm and mixed. The mixture had a softening temperature VST B 50 of 99° C. and a melt index MVI 200/5 of 7.4 ml/10 min. Through an inlet opening fitted to the extruder, 10.71 parts of the blowing agent mixtures having the compositions given in Table 1 were simultaneously injected continuously into the extruder. The gel which had been compounded uniformly in the extruder was then, after a residence time of 60 minutes, extruded into the atmosphere through a 300 mm wide die. The foam was conveyed through a mold channel connected to the extruder, giving a foam polystyrene board having a width of 650 mm. The die gap and the thickness and density, the latter determined in accordance with DIN 53 420, of the foam boards obtained are shown in Table 1. In each case, a uniform, closed-celled and dimensionally stable foam board was obtained.

TABLE 1

| Example | Amount of blowing agent % based on thermoplastic matrix | $C_2H_5OH$ % | $CH_3OCH_3$ % | $CO_2$ % | Die gap mm | Board thickness mm | Foam density g/l |
|---|---|---|---|---|---|---|---|
| 1 | 10.71 | 34.51 | 17.57 | 47.92 | 1.3 | 80 | 27.0 |
| 2 | 10.71 | 32.17 | 22.12 | 45.71 | 1.4 | 100 | 27.8 |

EXAMPLES 3 to 6

100 parts of a mixture of polystyrene and 2.75 % of white oil having a Vicat softening temperature VST B/50 of 92.3° C. and a melt index MVI 200/5 of 10.7 ml/10 min were continuously fed into an extruder having an internal screw diameter of 120 mm. At the same time as the polystyrene mixture, talc (mean particle diameter about 10 μm) was introduced into the extruder in the amounts given in Table 2. Through an inlet orifice fitted to the extruder, a blowing agent mixture having the composition given in Table 2 was simultaneously injected continuously into the extruder. The molten polystyrene which had been uniformly compounded in the extruder was, after a residence time of about 60 minutes, extruded into the atmosphere through a 300 mm wide die. The die gaps for the individual examples are shown in Table 2.

For comparison (Example 6), a polystyrene having a Vicat softening temperature of 101° C. and a melt index of 4.5 ml/10 min was, under the same conditions, extruded as described in Example 1 of EP-A 464 581 using the blowing agent mixture indicated there.

The foam produced was conveyed into a mold channel downstream of the die, giving a foamed polystyrene board having a width of 670 mm. Uniform, closed-celled and dimensionally stable foam boards were obtained. Table 2 gives the foam thicknesses and the densities in accordance with DIN 53 420.

EXAMPLES 7 to 12

100 parts of a mixture of polystyrene and 3% of various plasticizers (for composition of the mixture, melt index MVI and Vicat softening temperature VST see Table 3) were continuously fed into an extruder having an internal screw diameter of 53 mm. At the same time as the thermoplastic matric, 0.63 parts of talc (mean particle diameter about 10 μm) were introduced into the extruder. Through an inlet orifice fitted to the extruder, 4.25 parts of carbon dioxide were simultaneously injected continuously into the extruder. The molten polystyrene which had been uniformly compounded in the extruder was, after a residence time of about 10 minutes, extruded into the atmosphere through a 50 mm wide die. The die gap was 2.5 mm. The foam produced was conveyed into a mold channel downstream of the die, giving foamed polystyrene strips of elliptical cross section and having widths from 123 to 147 mm and thicknesses of from 56 to 88 mm. Uniform, closed-celled and dimensionally stable foam bodies were obtained.

The physical parameters for the respective example are shown in Table 3 (density in accordance with DIN 53 420, cross-sectional area of the foam strip).

TABLE 2

| Example | Talc Parts | $CO_2$ Parts | Ethanol Parts | Die gap mm | Foam thickness mm | Density $g \cdot l^{-1}$ |
|---|---|---|---|---|---|---|
| 3 | 0.15 | 5.1 | 3.7 | 1.4 | 80 | 35.2 |
| 4 | 0.32 | 4.9 | 3.7 | 1.6 | 80 | 38.7 |
| 5 | 0.32 | 5.3 | 3.7 | 1.8 | 100 | 38.0 |
| 6 | 0.15 | 3.0 | 6.3 | 1.4 | 50 | 33.8 |

In each case, the parts are based on 100 parts of the thermoplastic matrix of polystyrene and white oil. Example 6 is a comparative example not in accordance with the invention.

TABLE 3

| Example | Plasticizer | VST °C. | MVI ml/10 min | Density $g \cdot l^{-1}$ | Cross section $cm^2$ | Max. thickness mm |
|---|---|---|---|---|---|---|
| 7 | — | 101 | 4.5 | 58.7 | 48 | 56 |
| 8 | Glyceryl tristearate | 92 | 13.9 | 48.0 | 65 | 65 |
| 9 | Glyceryl monostearate | 92 | 13.4 | 56.8 | 81 | 72 |
| 10 | Citric acid tristearate | 93 | 14.2 | 54.2 | 73 | 73 |
| 11 | Diethylene glycol monoethyl ether | 81 | 21.7 | 47.8 | 79 | 74 |
| 12 | Polyethylene oxide (MW = 900) | 97 | 13.4 | 59.8 | 102 | 88 |

The Example 7 is a comparative example not in accordance with the invention.

We claim:

1. An extruded foam board having a minimum thickness of 20 mm and a cross section of at least 50 cm² produced using halogen-free blowing agents and comprising a thermoplastic matrix based on a styrene polymer, closed cells, which are free of halogen-containing gases and, optionally additives insoluble in the thermoplastic matrix, wherein the thermoplastic matrix has a Vicat softening temperature VST B 50 (in accordance with DIN 53 460) of at most 100° C. and a melt index MVI 200/5 (in accordance with DIN 53 735) of at least 5 ml/10 min.

2. A foam board as claimed in claim 1, having a thickness of more than 50 mm.

3. A foam board as claimed in claim 1, wherein more than 90%, of its cells are closed.

4. A foam board as claimed in claim 1, wherein the thermoplastic matrix is a styrene copolymer or a mixture of homopolystyrene with a styrene copolymer.

5. A foam board as claimed in claim 4, wherein the styrene copolymer is a block copolymer of styrene and from 1 to 50% by weight of a conjugated diene.

6. A foam board as claimed in claim 5, wherein the block copolymer is branched in a star-shaped manner.

7. A foam board as claimed in claim 5, wherein the conjugated diene is butadiene.

8. A foam board as claimed in claim 5, wherein the thermoplastic matrix comprises from 50 to 99% by weight of homopolystyrene and from 50 to 1% by weight of block copolymer.

9. A foam board as claimed in claim 1, wherein the thermoplastic matrix is a mixture of a styrene polymer and from 0.1 to 10% by weight of a plasticizer soluble in the styrene polymer.

10. A foam board as claimed in claim 9, wherein the plasticizer is a liquid paraffinic hydrocarbon, an organic ester, ether, acid amide or polyether.

11. A process for producing a foam board as claimed in claim 1 by extrusion of a mixture of the plasticized thermoplastic matrix with from 1 to 15% by weight of a halogen-free blowing agent and, optionally, customary additives.

12. A process as claimed in claim 11, wherein the blowing agent used is a mixture of
   a) from 1 to 100% by weight of carbon dioxide,
   b) up to 95% by weight of an ether select from the group consisting of dimethyl ether, methyl ethyl ether and methyl vinyl ether,
   c) up to 60% by weight of an alcohol or ketone having a boiling point in the range from 56° to 100° C., and
   d) up to 30% by weight of an aliphatic $C_3$–$C_6$-hydrocarbon.

13. A process as claimed in claim 11, wherein the blowing agent used is a mixture of
   a) from 20 to 95% by weight of carbon dioxide,
   c) from 80 to 5% by weight of ethanol and
   d) from 0 to 10% by weight of an aliphatic $C_3$–$C_6$-hydrocarbon.

14. A process as claimed in claim 11, wherein the blowing agent used is exclusively carbon dioxide.

15. A process as claimed in claim 11, wherein the blowing agent used is a mixture of
   a) from 2 to 90% by weight of carbon dioxide,
   b) from 1 to 30% by weight of dimethyl ether,
   c) from 0 to 60% by weight of ethanol, and
   d) up to 10% by weight of an aliphatic $C_3$–$C_6$-hydrocarbon.

16. A foam board as claimed in claim 2, having a thickness of 80–200 mm.

17. A foam board as claimed in claim 3, wherein more than 95% of cells are closed.

* * * * *